(12) United States Patent
Nam et al.

(10) Patent No.: US 11,741,034 B2
(45) Date of Patent: Aug. 29, 2023

(54) MEMORY DEVICE INCLUDING DIRECT MEMORY ACCESS ENGINE, SYSTEM INCLUDING THE MEMORY DEVICE, AND METHOD OF OPERATING THE MEMORY DEVICE

(71) Applicant: SAMSUNG ELECTRONICS CO., LTD., Suwon-si (KR)

(72) Inventors: Heehyun Nam, Seoul (KR); Jeongho Lee, Gwacheon-si (KR); Wonseb Jeong, Hwaseong-si (KR); Ipoom Jeong, Hwaseong-si (KR); Hyeokjun Choe, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 17/368,981

(22) Filed: Jul. 7, 2021

(65) Prior Publication Data

US 2022/0147476 A1 May 12, 2022

(30) Foreign Application Priority Data

Nov. 6, 2020 (KR) ........................ 10-2020-0148133

(51) Int. Cl.
*G06F 13/28* (2006.01)
*G06F 3/06* (2006.01)

(52) U.S. Cl.
CPC ............ *G06F 13/28* (2013.01); *G06F 3/0604* (2013.01); *G06F 3/0655* (2013.01); *G06F 3/0679* (2013.01); *G06F 2213/28* (2013.01)

(58) Field of Classification Search
None
See application file for complete search history.

(56) References Cited

U.S. PATENT DOCUMENTS

| | | |
|---|---|---|
| 5,729,762 A | 3/1998 | Kardach et al. |
| 8,706,942 B2 | 4/2014 | Madukkarumukumana et al. |
| 9,098,402 B2 | 8/2015 | Fanning et al. |
| 9,229,656 B1 | 1/2016 | Contreras et al. |
| 9,965,416 B2 | 5/2018 | Galda et al. |
| 10,162,770 B2 | 12/2018 | Das Sharma |
| 10,621,138 B2 | 4/2020 | Hu et al. |
| 10,642,766 B1 | 5/2020 | Kilsdonk |
| 2017/0242764 A1* | 8/2017 | Antony .............. G06F 11/2028 |
| 2017/0364394 A1 | 12/2017 | Fujita |
| 2021/0311868 A1* | 10/2021 | Chen .................. G11C 11/5628 |

* cited by examiner

*Primary Examiner* — Scott C Sun
(74) *Attorney, Agent, or Firm* — Sughrue Mion, PLLC

(57) ABSTRACT

A memory device is configured to communicate with a plurality of host devices, through an interconnect, and includes a memory including a plurality of memory regions that includes a first memory region that is assigned to a first host device and a second memory region that is assigned to a second host device. The memory device further includes a direct memory access (DMA) engine configured to, based on a request from the first host device, the request including a copy command to copy data that is stored in the first memory region to the second memory region, read the stored data from the first memory region, and write the read data to the second memory region without outputting the read data to the interconnect.

20 Claims, 14 Drawing Sheets

MEMORY DEVICE INCLUDING DIRECT MEMORY ACCESS ENGINE, SYSTEM INCLUDING THE MEMORY DEVICE, AND METHOD OF OPERATING THE MEMORY DEVICE

CROSS-REFERENCE TO RELATED APPLICATION

This application is based on and claims priority under 35 U.S.C. § 119 to Korean Patent Application No. 10-2020-0148133, filed on Nov. 6, 2020, in the Korean Intellectual Property Office, the disclosure of which is incorporated by reference herein in its entirety.

BACKGROUND

The disclosure relates to a memory device, and more particularly, to a memory device including a direct memory access (DMA) engine, a system including the memory device, and a method of operating the memory device.

A system (e.g., a computing system) configured to process data may include a central processing unit (CPU), a memory device, input/output (I/O) devices, and a root complex configured to transmit information between devices included in the system. As an example, the devices included in the system may transmit and receive requests and responses based on various types of protocols, such as peripheral component interconnect express (PCIe).

The system may include a memory device, which may be shared between at least two devices that are different from the memory device. During a data processing process, various types of computing operations may be performed, and data accessed by the memory device may be frequently migrated. In this case, a latency may be increased or the efficiency of an interface bandwidth may be reduced during a data transmission process. As a result, the time for the computing operations may increase.

SUMMARY

Provided are a memory device, which may reduce a latency and increase the efficiency of an interface bandwidth during a process of transmitting data to process a computing operation of a computing system, a system including the memory device, and a method of operating the memory device.

Additional aspects will be set forth in part in the description that follows and, in part, will be apparent from the description, or may be learned by practice of the presented embodiments.

According to embodiments, there is provided a memory device configured to communicate with a plurality of host devices, through an interconnect, and including a memory including a plurality of memory regions that includes a first memory region that is assigned to a first host device and a second memory region that is assigned to a second host device. The memory device further includes a direct memory access (DMA) engine configured to, based on a request from the first host device, the request including a copy command to copy data that is stored in the first memory region to the second memory region, read the stored data from the first memory region, and write the read data to the second memory region without outputting the read data to the interconnect.

According to embodiments, there is provided a method of operating a memory device, the memory device being configured to communicate with a plurality of host devices through an interconnect, the memory device including a plurality of memory regions that includes a first memory region that is assigned to a first host device and a second memory region that is assigned to a second host device, and the method including receiving, from the first host device, a request including a copy command to copy data that is stored in the first memory region to the second memory region. The method further includes based on the request being received, reading the stored data from the first memory region, and writing the read data to the second memory region without outputting the read data to the interconnect.

According to embodiments, there is provided a host system including a root complex including a first root port and a second root port, the root complex being configured to provide an interconnect based on a predetermined protocol, and a first host device configured to communicate with a memory device through the first root port, a first memory region corresponding to a first logical device of the memory device being assigned to the first host device. The host system further includes a second host device configured to communicate with the memory device through the second root port, a second memory region corresponding to a second logical device of the memory device being assigned to the second host device. Based on the first host device transmitting, to the memory device, a request to copy data that is stored in the first memory region to the second memory region, the host system is configured to receive, from the memory device, a response indicating completion of the copying the data stored in the first memory region to the second memory region, without receiving the data from the memory device through the root complex.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Embodiments will now be described more fully with reference to the accompanying drawings.

Figure 1:
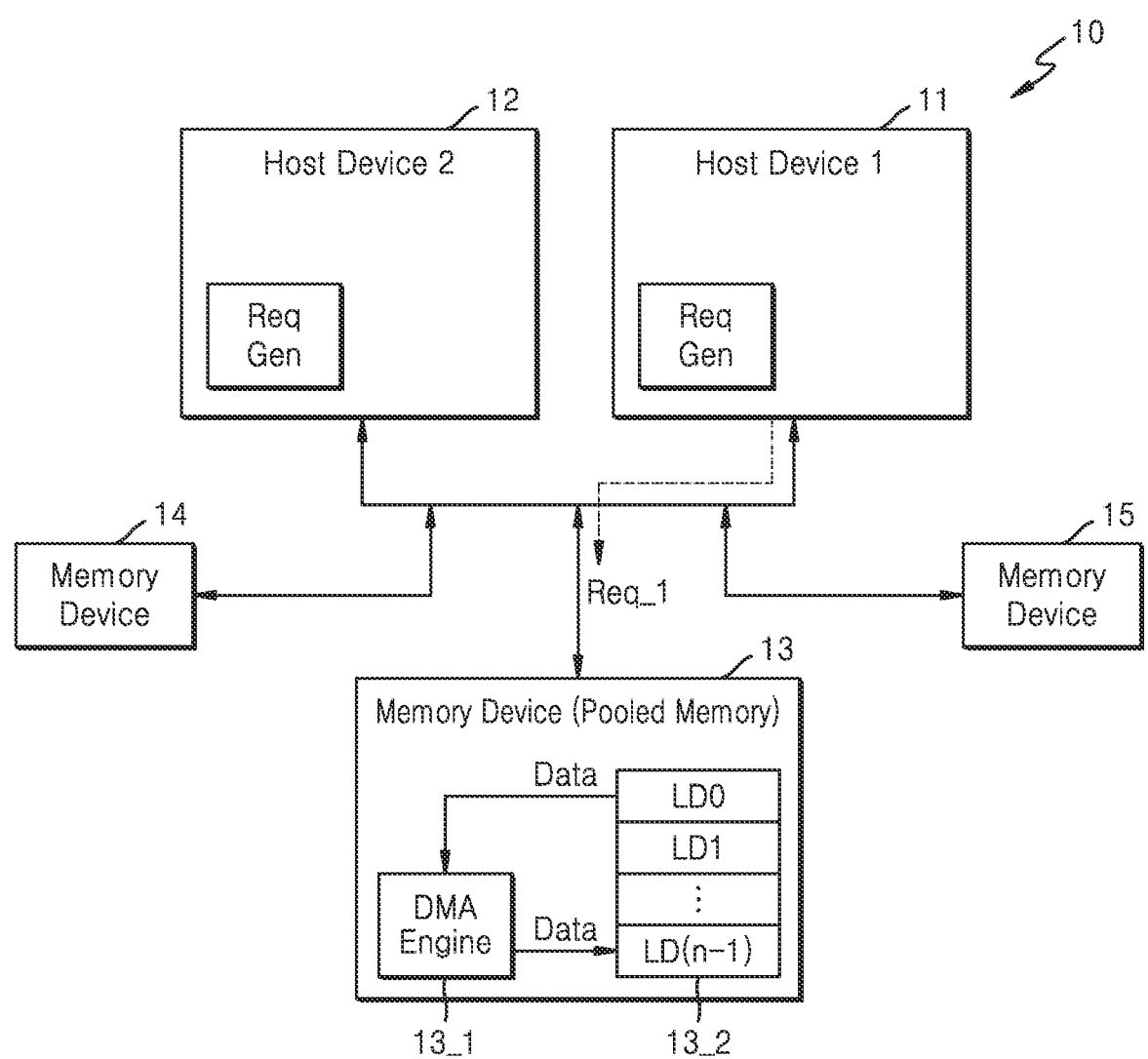
FIG. 1 is a block diagram of a system including a memory device, according to embodiments.

FIG. 1 is a block diagram of a system 10 including a memory device, according to embodiments.

Referring to FIG. 1, the system 10 may be variously referred to as, for example, a data processing system or a computing system and include at least one device. As an example, the system 10 may include at least one memory device and devices configured to request data access to the at least one memory device. The devices configured to request data access may be referred to as host devices in that the devices operate for the at least one memory device.

According to embodiments, the system 10 may include a first host device 11, a second host device 12, and first to third memory devices 13 to 15. Although the system 10 including two host devices and three memory devices is illustrated as an example in FIG. 1, embodiments are not limited thereto, and various numbers of devices may be included in the system 10.

Each of the first to third memory devices 13 to 15 may include various types of memories. As an example, each of the first to third memory devices 13 to 15 may include a non-volatile memory, such as a solid-state drive (SSD), flash memory, magnetic random access memory (MRAM), ferroelectric RAM (FRAM), phase-change RAM (PRAM), and resistive RAM (RRAM). However, embodiments are not limited thereto, and each of the first to third memory devices 13 to 15 may include dynamic RAM (DRAM), such as double data rate synchronous DRAM (DDR SDRAM), low-power DDR (LPDDR) SDRAM, graphics DDR (GDDR) SDRAM, and Rambus DRAM (RDRAM).

The devices included in the system 10 may communicate with each other through an interconnect (or link) configured to support at least one protocol. Each of the devices may include internal components configured to perform protocol-based communication supported by the interconnect. As an example, at least one protocol selected from techniques, such as a peripheral component interconnect express (PCIe) protocol, a compute express link (CXL) protocol, an XBus protocol, an NVLink protocol, an infinity fabric protocol, a cache coherent interconnect for accelerators (CCIX) protocol, and a coherent accelerator processor interface (CAPI) protocol, may be applied to the interconnect. In the following embodiments, communication based on a CXL protocol will mainly be described. However, embodiments are not limited thereto, and various protocols other than the CXL protocol may be applied.

Although an interconnect among the first host device 11, the second host device 12, and the first to third memory devices 13 to 15 is briefly illustrated for brevity, the system 10 may include a root complex connected to a plurality of devices through root ports, and the first host device 11, the second host device 12, and the first to third memory devices 13 to 15 may communicate with each other through the root complex. For example, the root complex may manage transactions between the first and second host devices 11 and 12 and the first to third memory devices 13 to 15. In embodiments, mutual communication may be performed based on various other components and functions according to a CXL standard. As an example, communication using various protocols may be enabled based on components (e.g., a flex bus and a switch) disclosed in the CXL standard.

At least some of the first to third memory devices 13 to 15 may be connected to the first host device 11 and/or the second host device 12 through a predetermined protocol-based bridge (e.g., a PCI bridge) configured to control a communication path.

According to embodiments, each of the first host device 11 and the second host device 12 may include various types of devices. For example, each of the first host device 11 and the second host device 12 may include any one or any combination of a programmable component, a component (e.g., an intellectual property (IP) core) configured to provide a fixed function, a reconfigurable component, and a peripheral device. The programmable component may be a central processing unit (CPU), graphics processing unit (GPU), or a neural processing unit (NPU), which is a main processor configured to control all operations of the system 10. The reconfigurable component may be a field programmable gate array (FPGA). The peripheral device may be a network interface card (NIC).

According to embodiments, any one or any combination of the first to third memory devices 13 to 15 may be shared between the first host device 11 and the second host device 12. For example, the first memory device 13 may be a pooled memory shared between the first host device 11 and the second host device 12. The first memory device 13 may store instructions executed by the first host device 11 and the second host device 12 or store input data for computing operations and/or results of the computing operations. The first memory device 13 may include a direct memory access (DMA)) engine 13_1 and a memory 13_2.

According to embodiments, the memory 13_2 may include a plurality of memory regions, which are assigned to a plurality of host devices that are different from each other. For example, the memory regions may correspond to logical devices, which are logically divided from each other, and the first memory device 13, which is one physical device, may be recognized as a plurality of devices (e.g., a plurality of memory devices) by the system 10. The memory 13_2 may include first to n-th memory regions LD0 to LD(n−1). In the embodiment shown in FIG. 1, it is assumed that the first memory region LD0 is assigned to the first host device 11, and the n-th memory region LD(n−1) is assigned to the second host device 12. Each of the first host device 11 and the second host device 12 may include a request generator. The first memory region LD0 and the n-th memory region LD(n−1) may be independently accessed by different host devices. As described above, the system 10 may include various CXL-based devices. When the first host device 11 corresponds to a CPU and the first memory device 13 is a CXL-based Type 3 device, the first host device 11 may execute hierarchical software including an application, generate a packet including data, and transmit the packet to the first memory device 13, and the request generator of the first host device 11 of FIG. 1 may include hardware and/or software components related to the generation of the packet. In addition, the first memory device 13 may include components configured to process the packet including the data. As described below, the first memory device 13 may include a memory controller configured to process the packet. The memory controller may be implemented as a separate device from the memory 13_2 or included in the same device as the memory 13_2. Also, the first to n-th memory regions LD0 to LD(n−1) may be variously allocated to host devices, and as an example, at least two memory areas among the first to n-th memory regions LD0 to LD(n−1) may be allocated to one host device.

Moreover, the DMA engine 13_1 may control transmission paths of data stored in the memory 13_2 and data read from the memory 13_2. As an example, the DMA engine 13_1 may transmit data read from any one memory region of the memory 13_2 to another memory region thereof. In various data transmission operations performed by the system 10, data stored in a region assigned to a host device may be read and stored in (or copied to) a region assigned to another host device. For example, in the memory 13_2, data stored in the first memory region LD0 may be read, and the read data may be stored in the n-th memory region LD(n−1).

According to embodiments, when data is transmitted between a plurality of logical devices in a memory device corresponding to one physical device, data read from the first memory device 13 may be transmitted through a path of the first memory device 13, based on the control of the DMA engine 13_1, without being output to an interconnect. As an example, a request including a copy command may be provided to the memory device, and the copy command may be defined differently from normal read and write commands. As an example, the first host device 11 may provide a first access request Req_1 including a copy command to the first memory device 13. The first access request Req_1 may include an address (e.g., a source address) indicating a location of the first memory region LD0) and an address (e.g., a destination address) indicating a location of an n-th memory region LD(n−1).

According to embodiments, in response to the first access request Req_1, the DMA engine 13_1 may perform a path control operation to receive data Data read from the first memory region LD0 and transmit the data Data to the n-th memory region LD(n−1). For example, the first memory device 13 may include a processor configured to process the first access request Req_1. The first memory device 13 may transmit the data Data read from the first memory region LD0 to the n-th memory region LD(n−1) based on the control of the DMA engine 13_1 included in the first memory device 13, without outputting the data Data read from the first memory region LD0 to an external interconnect, based on information included in the first access request Req_1.

In contrast, when a request from a host device corresponds to a normal read request or a request to migrate data to a memory device, which is physically different from the first memory device 13, the first memory device 13 may output data Data read from the memory 13_2 through the external interconnect. In an operation example, in response to the first access request Req_1 from the first host device 11, the data Data read from the first memory region LD0 may be transmitted through a path passing through the external interconnect of the first memory device 13, based on the control of the DMA engine 13_1.

According to the example embodiment as described above, data transfer efficiency between logical devices recognized as different devices in the same memory device may be improved. For example, a copy function may be performed using a DMA engine in a memory device without processing data read from a memory region, based on a predetermined protocol, to transmit the read data to a memory region. Accordingly, a latency of a data processing operation may be reduced, and data traffic of the interconnect may be reduced.

Figure 2A:
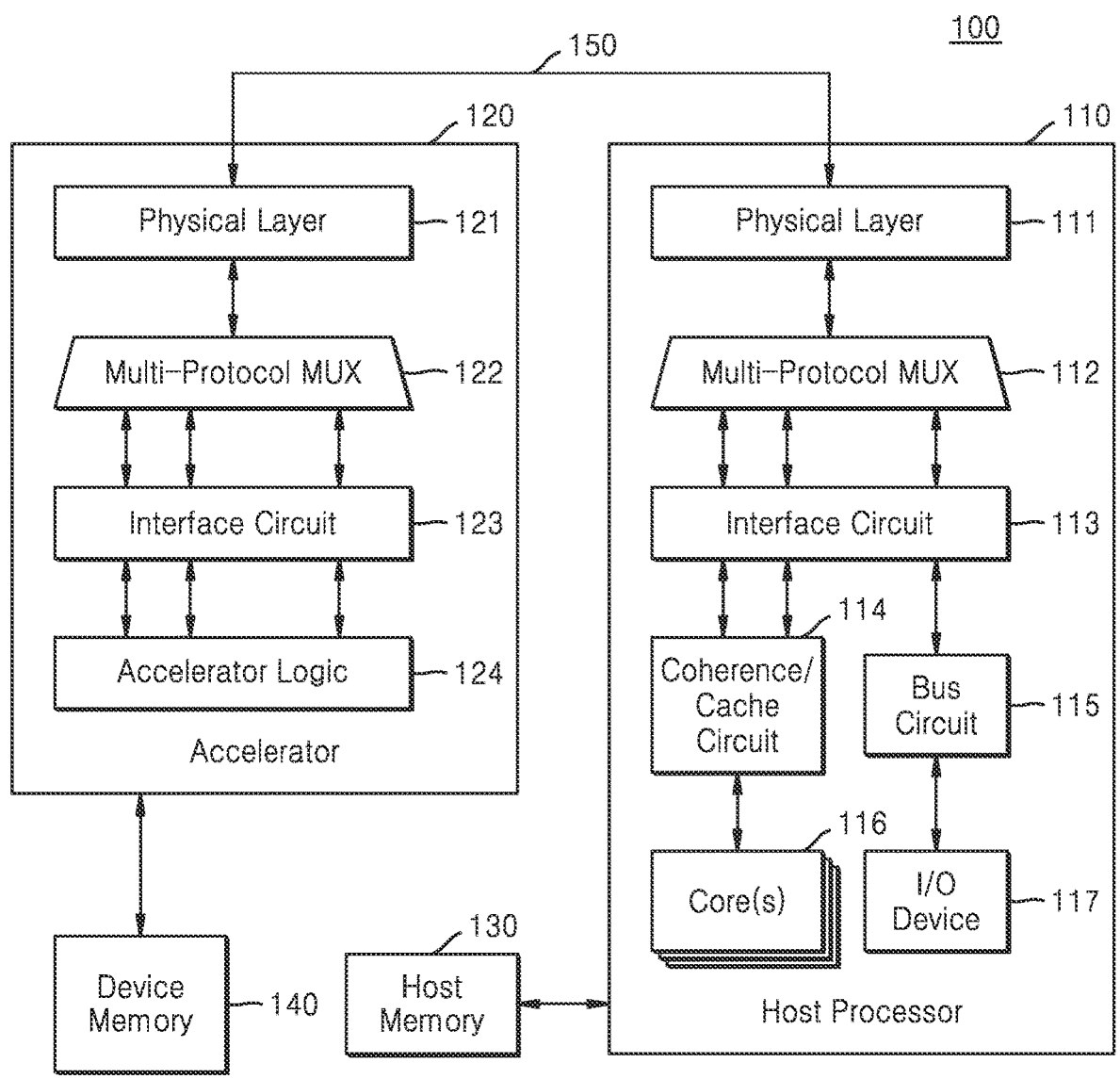
FIGS. 2A and 2B are block diagrams of host devices included in a system according to embodiments.
Figure 2B:
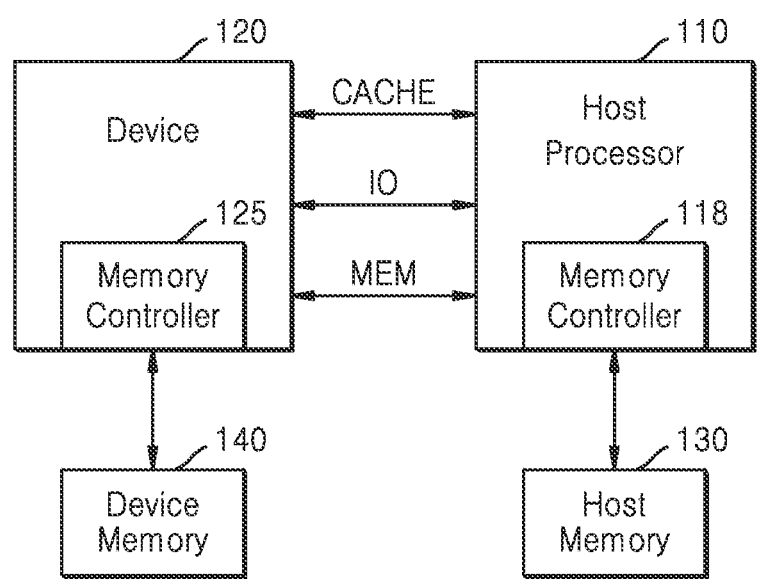

FIGS. 2A and 2B are block diagrams of host devices included in a system 100 according to embodiments. FIGS. 2A and 2B illustrate a CXL-protocol-based link as an example of an interconnect between devices.

Referring to FIG. 2A, the system 100 may include various types of host devices. Although a host processor 110 and an accelerator 120 (e.g., a GPU and an FPGA) are illustrated as examples in FIG. 2A, embodiments are not limited thereto. Various other types of devices configured to transmit an access request may be applied to the system 100. The host processor 110 and the accelerator 120 may transmit or receive messages and/or data to and from each other through a link 150 configured to support a CXL protocol. In embodiments, the host processor 110, which is a main processor, may be a CPU configured to control all operations of the system 100.

In addition, the system 100 may further include a host memory 130 connected to the host processor 110 and a device memory 140 mounted at the accelerator 120. The host memory 130 connected to the host processor 110 may support cache coherency. The device memory 140 may be managed by the accelerator 120 independently of the host memory 130. The host memory 130 and the device memory 140 may be accessed by a plurality of host devices. As an example, the accelerator 120 and devices, such as an NIC, may access the host memory 130 in a PCIe DMA manner.

In some embodiments, the link 150 may support a plurality of protocols (e.g., sub-protocols) defined in the CXL protocol, and messages and/or data may be transmitted through the plurality of protocols. For example, the protocols may include a non-coherent protocol (or an I/O protocol CXL.io), a coherent protocol (or a cache protocol CXL.cache), and a memory access protocol (or a memory protocol CXL.memory).

The I/O protocol CXL.io may be an I/O protocol similar to PCIe. A shared memory (e.g., a pooled memory) included in the system 100 may communicate with the host devices based on the PCIe or the I/O protocol CXL.io. The memory device 13 according to the embodiment shown in FIG. 1 may be accessed by the host processor 110 and the accelerator 120 through an interconnect based on PCIe or the I/O protocol CXL.io. In addition, the cache protocol CXL.cache may provide a protocol via which the accelerator 120 may access the host memory 130, and the memory protocol CXL.memory may provide a protocol via which the host processor 110 may access the device memory 140.

The accelerator 120 may refer to an arbitrary device configured to provide functions to the host processor 110. For example, at least some of computing operations and I/O operations executed on the host processor 110 may be offloaded to the accelerator 120. In some embodiments, the accelerator 120 may include any one or any combination of a programmable component (e.g., a GPU and an NPU), a component (e.g., an IP core) configured to provide a fixed function, and a reconfigurable component (e.g., an FPGA).

The accelerator 120 may include a physical layer 121, a multi-protocol multiplexer (MUX) 122, an interface circuit 123, and an accelerator logic 124 and communicate with the device memory 140. The accelerator logic 124 may communicate with the host processor 110 through the multi-protocol MUX 122 and the physical layer 121 using the plurality of protocols described above.

The interface circuit 123 may determine one of the plurality of protocols based on messages and/or data for communication between the accelerator logic 124 and the host processor 110. The interface circuit 123 may be connected to at least one protocol queue included in the multi-protocol MUX 122 and transmit and receive messages and/or data to and from the host processor 110 through the at least one protocol queue.

The multi-protocol MUX 122 may include at least one protocol queue and transmit and receive messages and/or data to and from the host processor 110 through at least one protocol queue. In some embodiments, the multi-protocol MUX 122 may include a plurality of protocol queues corresponding respectively to the plurality of protocols supported by the link 150. In some embodiments, the multi-protocol MUX 122 may arbitrate between communications of different protocols and perform communication based on a selected protocol.

The device memory 140 may be connected to the accelerator 120 and be referred to as a device-attached memory. The accelerator logic 124 may communicate with the device memory 140 based on a protocol (i.e., a device-specific protocol) that is independent of the link 150. In some embodiments, the accelerator 120 may include a controller, which is a component for accessing the device memory 140, and the accelerator logic 124 may access the device memory 140 through the controller. The controller may access the device memory 140 of the accelerator 120 and also, enable the host processor 110 to access the device memory 140 through the link 150. In some embodiments, the device memory 140 may correspond to a CXL-based device-attached memory.

The host processor 110 may be a main processor (e.g., a CPU) of the system 100. In some embodiments, the host processor 110 may be a CXL-based host processor or host. As shown in FIG. 2A, the host processor 110 may be connected to the host memory 130 and include a physical layer 111, a multi-protocol MUX 112, an interface circuit 113, a coherence/cache circuit 114, a bus circuit 115, at least one core 116, and an I/O device 117.

The at least one core 116 may execute an instruction and be connected to the coherence/cache circuit 114. The coherence/cache circuit 114 may include a cache hierarchy and be referred to as a coherence/cache logic. As shown in FIG. 2A, the coherence/cache circuit 114 may communicate with the at least one core 116 and the interface circuit 113. For example, the coherence/cache circuit 114 may enable communication through at least two protocols including a coherent protocol and a memory access protocol. In some embodiments, the coherence/cache circuit 114 may include a DMA circuit. The I/O device 117 may be used to communicate with the bus circuit 115. For example, the bus circuit 115 may be a PCIe logic, and the I/O device 117 may be a PCIe I/O device.

The interface circuit 113 may enable communication between components (e.g., the coherence/cache circuit 114 and the bus circuit 115) of the host processor 110 and the accelerator 120. In some embodiments, the interface circuit 113 may enable communication between the components of the host processor 110 and the accelerator 120 according to a plurality of protocols (e.g., the non-coherent protocol, the coherent protocol, and the memory protocol). For example, the interface circuit 113 may determine one of the plurality of protocols based on the messages and/or data for communication between the components of the host processor 110 and the accelerator 120.

The multi-protocol MUX 112 may include at least one protocol queue. The interface circuit 113 may be connected to the at least one protocol queue and transmit and receive messages and/or data to and from the accelerator 120 through the at least one protocol queue. In some embodiments, the interface circuit 113 and the multi-protocol MUX 112 may be integrally formed into one component. In some embodiments, the multi-protocol MUX 112 may include a plurality of protocol queues corresponding respectively to the plurality of protocols supported by the link 150. In some embodiments, the multi-protocol MUX 112 may arbitrate communications of different protocols and provide selected communications to the physical layer 111.

Moreover, according to embodiments, a request generator of the host device shown in FIG. 1 may correspond to various components shown in FIG. 2A or be included in the components. For example, functions of the request generator may be performed by various components shown in FIG. 2A, for example, the accelerator logic 124, the at least one core 116, and the I/O device 117.

The memory device 13 shown in FIG. 1 may be accessed by the host processor 110, the accelerator 120, and various peripheral devices. As an example, the memory device shown in FIG. 1 may include a first memory region assigned to the host processor 110 and a second memory region assigned to the accelerator 120 and directly transmit data between the first memory region and the second memory region based on the control of a DMA engine included therein. As an example, data may be read from the first memory region in response to a request of the host processor 110, and the read data may be copied to the second memory region based on the control of the DMA engine without being output to the outside of the memory device.

FIG. 2B illustrates an example of a multi-protocol for communication in the system 100 of FIG. 2A. Also, FIG. 2B illustrates an example in which each of the host processor 110 and the accelerator 120 includes a memory controller. The memory controller shown in FIG. 2B may include some of components included in each of the devices shown in FIG. 2A or be implemented separately from the components.

The host processor 110 may communicate with the accelerator 120 based on a plurality of protocols. According to the above-described CXL examples, the plurality of protocols may include a memory protocol CXL.memory (or MEM), a coherent protocol CXL.cache (or COH), and a non-coherent protocol CXL.io (or IO). The memory protocol MEM may define transactions between a master and a subordinate. For example, the memory protocol MEM may define a transaction from the master to the subordinate and a transaction from the subordinate to the master. The coherent protocol COH may define interactions between the accelerator 120 and the host processor 110. For example, an interface of the coherent protocol COH may include three channels including a request, a response, and data. The non-coherent protocol IO may provide a non-coherent load/store interface for I/O devices.

The accelerator 120 may include a memory controller 125 configured to communicate with the device memory 140 and access the device memory 140. In some embodiments, the memory controller 125 may be outside the accelerator 120 and integrated with the device memory 140. In addition, the host processor 110 may include a memory controller 118 configured to communicate with the host memory 130 and access the host memory 130. In some embodiments, the memory controller 118 may be outside the host processor 110 and integrated with the host memory 130.

Figure 3:
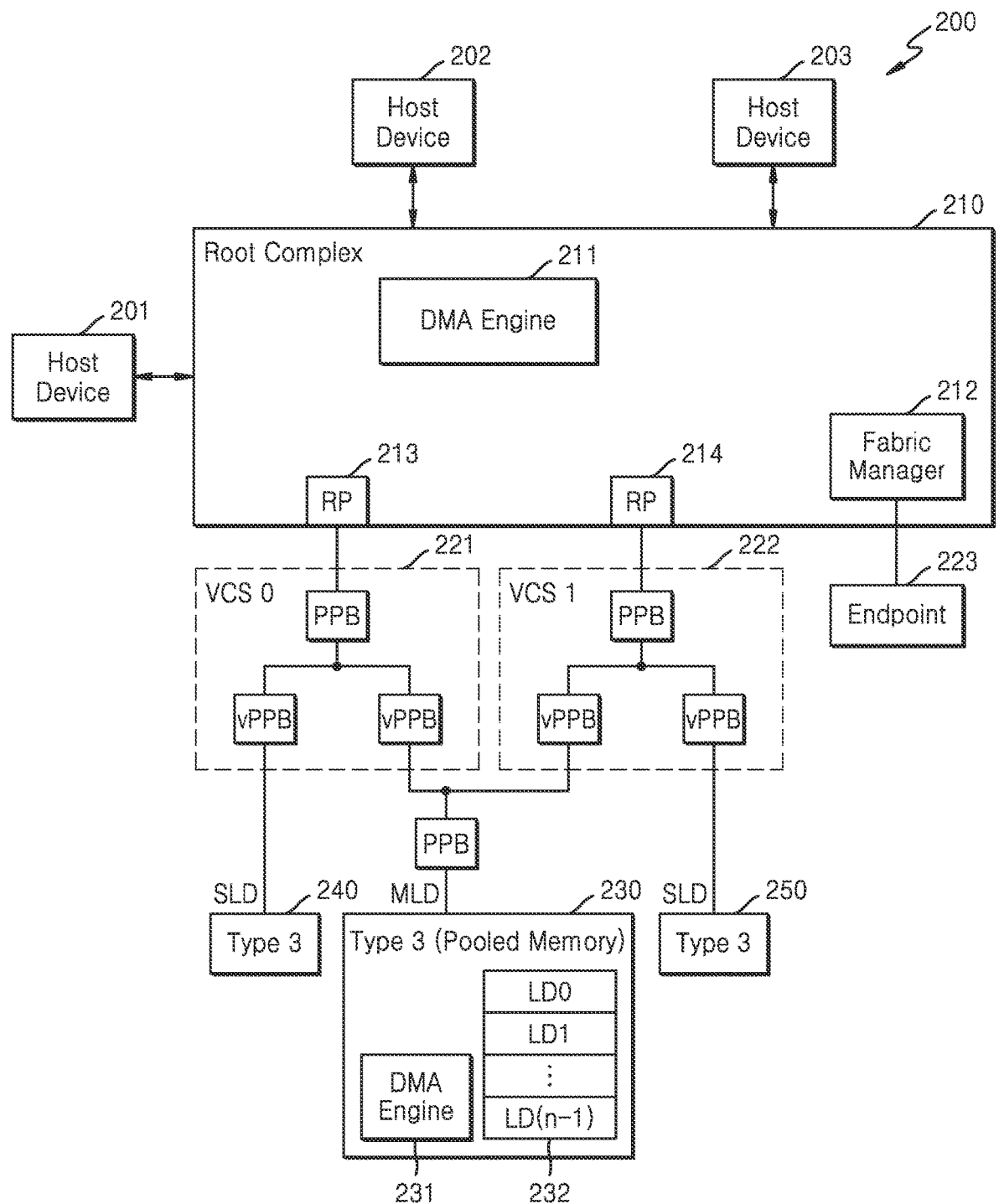
FIG. 3 is a block diagram of a system according to embodiments.

FIG. 3 is a block diagram of a system 200 according to embodiments. A plurality of host devices (e.g., 201 to 203) shown in FIG. 3 may include various types of devices (e.g., a CPU, a GPU, an NPU, an FPGA, and a peripheral device) according to the above-described embodiments.

The system 200 may include a root complex 210 along with the host devices 201 to 203. The root complex 210 may include a DMA engine 211 and at least one root port (e.g., first and second root ports (RPs) 213 and 214) connected to a memory device. According to embodiments, the root complex 210 may further include a fabric manager 212 configured to transmit data or a request through fabric, such as Ethernet. The root complex 210 may be connected to an endpoint 223 through the fabric. As an example, the endpoint 223 may include flash memory (e.g., an SSD and a universal flash storage (UFS)), a volatile memory (e.g., SDRAM), and a non-volatile memory (e.g., PRAM, MRAM, RRAM, and FRAM). Although the root complex 210 is illustrated as a separate component from a host device in FIG. 3, the root complex 210 may be integrated in each of the host devices 201 to 203.

The root complex 210 may provide data communication between the host devices 201 to 203 and first to third memory devices 230 to 250 based on various types of protocols, and support a CXL protocol according to the above-described embodiment. In embodiments, the root complex 210 and the first to third memory devices 230 to 250 may perform interface functions including various protocols (e.g., an I/O protocol CXL.io) defined in CXL.

Moreover, each of the first to third memory devices 230 to 250 may correspond to a Type 3 device defined in the CXL protocol. Accordingly, each of the first to third memory devices 230 to 250 may include a memory expander. According to embodiments, the memory expander may include a controller. Although one device including a memory is illustrated in FIG. 3, a memory including a plurality of memory regions and a memory expander may be implemented as separate devices.

According to embodiments, the system 200 may support a plurality of virtual channels. A virtual channel may provide a plurality of transmission paths, which are logically divided from each other in one physical interface. Although the embodiment shown in FIG. 3 illustrates a first virtual channel (VCS) 221 corresponding to the first root port 213 and a second virtual channel 222 corresponding to the second root port 214, the virtual channels included in the system 200 may be implemented in various other forms. In addition, the host devices 201 to 203, the root complex 210, and components of the virtual channels may be described as constituting a host system.

Through the virtual channels, one root port may be connected to a plurality of devices, which are different from each other, or at least two root ports may be connected to one device. PCI/PCIe will now be described as an example. The first root port 213 may be connected to a second memory device 240 through a path including at least one PCI-to-PCI bridge (PPB) and at least one virtual PCI-to-PCI bridge (vPPB) and be connected to the first memory device 230 through another path including at least one PPB and at least one vPPB. Similarly, the second root port 214 may be connected to the first memory device 230 through a path including at least one PPB and at least one vPPB and be connected to a third memory device 250 through another path including at least one PPB and at least one vPPB.

The system 200 may provide a multi-logical device (MLD) supported by the CXL protocol. In embodiments, in a structure of the system 200 shown in FIG. 3, the first memory device 230 may communicate with at least two host devices through the first and second root ports 213 and 214. A memory 232 of the first memory device 230 may include first to n-th memory regions LD0 to LD(n−1), which are assigned to different host devices. As an example, the first memory region LD0 may be assigned to the first host device 201 and communicate with the first host device 201 through the first root port 213. In addition, the second memory region LD1 may be assigned to the second host device 202 and communicate with the second host device 202 through the second root port 214. Moreover, each of the second and third memory devices 240 and 250 may perform communication through any one root port and correspond to a single-logical device (SLD).

The first memory device 230 may include a DMA engine 231 and be logically recognized as a plurality of devices. In an operation example, a data processing operation of copying data stored in any one logical device (e.g., a memory region) to another logical device may be performed. According to the above-described embodiments, data read from any one memory region may be copied to another memory region without being output to the outside, based on the control of the DMA engine 231. That is, data transmission between a plurality of logical devices in the first memory device 230 may be performed by the DMA engine 231 of the first memory device 230 without migrating data through the virtual channel and the root port. Accordingly, a latency may be reduced, and the efficiency of an interface bandwidth may increase. According to embodiments as described above, the structure of the system 200 may not be changed or the change may be minimized, and unnecessary data movement may be minimized. For example, when a memory device including a DMA engine is added to the system 200, by adding a resource for driving the DMA engine in the memory device to the system 200, the copying of data as described above can be controlled.

Figure 4:
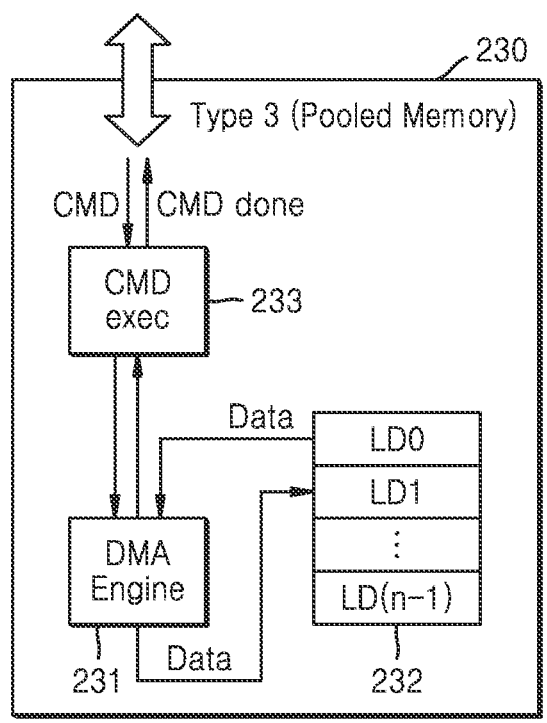
FIG. 4 is a block diagram of a first memory device of FIG. 3.

FIG. 4 is a block diagram of the first memory device 230 of FIG. 3.

Referring to FIGS. 3 and 4, the first memory device 230 may include the DMA engine 231, the memory 232, and a command (CMD) executor 233. The memory 232 may include a plurality of memory regions, that is, first to n-th memory regions LD0 to LD(n−1). Although a first memory device 230 is exemplarily illustrated as one device in FIG. 4, and the memory 232 and a memory expander including the DMA engine 231 and the command executor 233 may be implemented as separate devices as described above.

The first memory device 230 may include an interface circuit and communicate with the outside based on a predetermined protocol. The command executor 233 may receive a request including a command CMD from an external host device, execute the command CMD, and determine whether the request indicates the copying of data Data between the memory regions of the memory 232. The DMA engine 231 may control a transmission path of data Data based on the control of the command executor 233. As an example, the DMA engine 231 may receive data Data read from the first memory region LD0, which is assigned to any one host device, and transmit the data Data to the second memory region LD1, which is assigned to another host device. The DMA engine 231 may provide information indicating the completion of the copying of the data Data, to the command executor 233, and output a response indicating the completion of the copying of the data Data, to the outside through the command executor 233.

Figure 5A:
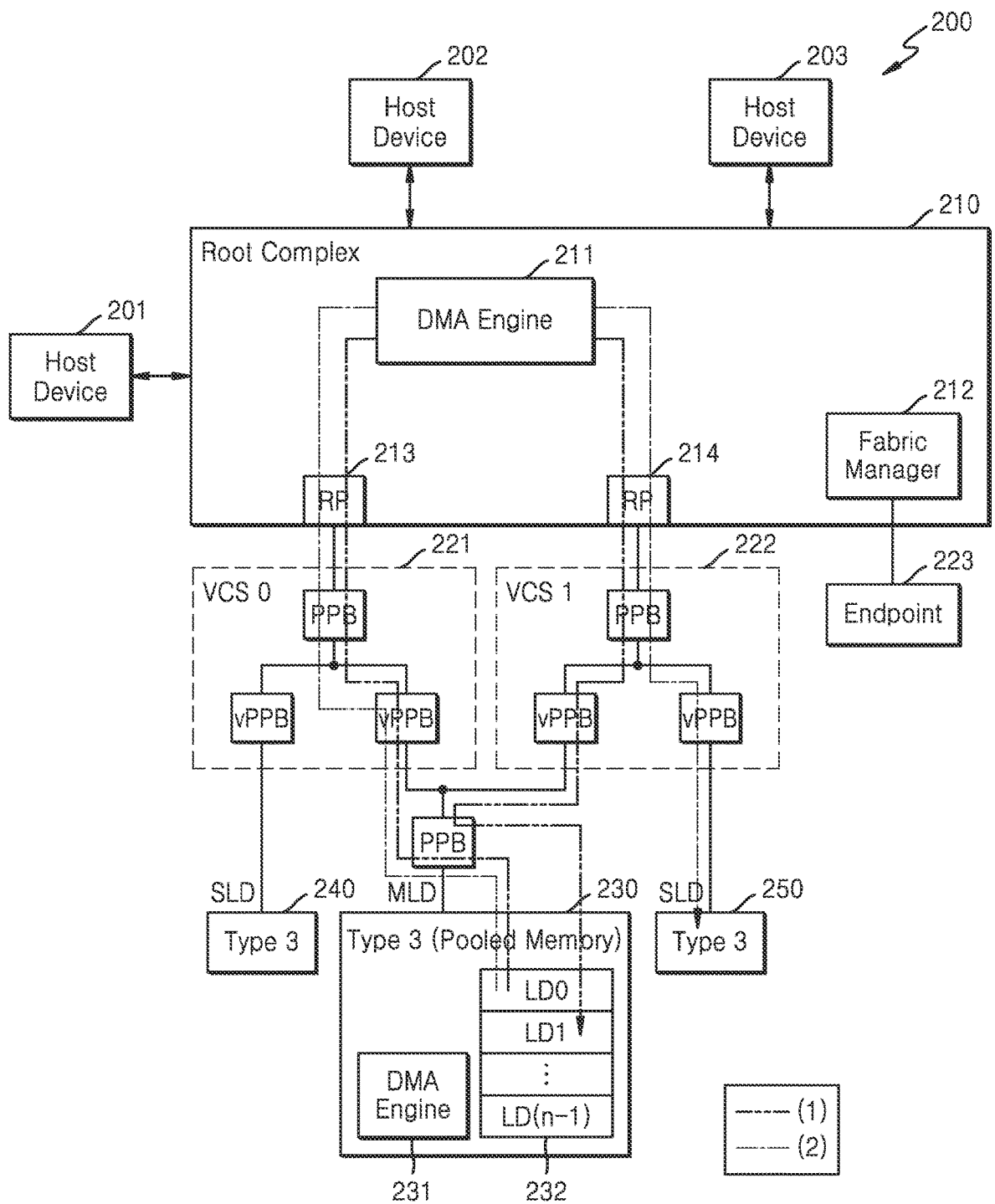
FIGS. 5A and 5B are diagrams of examples of a transmission path of data in a system according to embodiments.
Figure 5B:
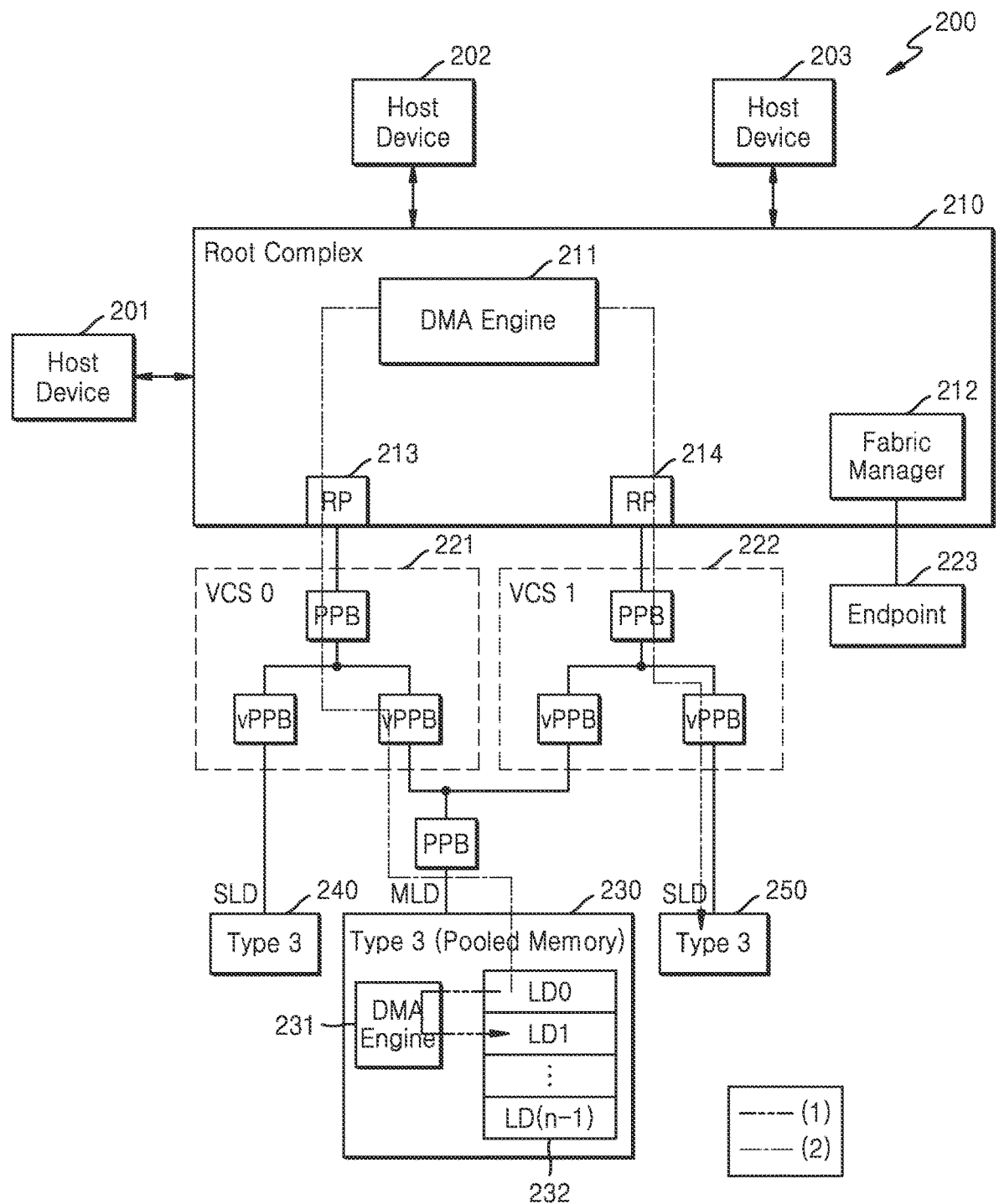

FIGS. 5A and 5B are diagrams of examples of a transmission path of data in a system according to embodiments. Because components shown in FIGS. 5A and 5B are described in the above-described embodiments, a detailed description thereof may be omitted. FIG. 5A illustrates a data transmission path to which embodiments are not applied, and FIG. 5B illustrates a data transmission path according to embodiments.

Referring to FIG. 5A, a memory device (e.g., a first memory device 230) including MLDs may be provided, and a request from host devices may be provided to the first memory device 230. The data transmission path may be controlled in response to the request from the host devices. As an example, assuming that data from a first memory region LD0 is copied to a second memory region LD1 corresponding to another logical device, data read from the first memory region LD0 may be provided to a DMA engine 211 included in a root complex 210 through a virtual channel and a root port, and the DMA engine 211 may transmit the data to the second memory region LD1 of the first memory device 230 through another root port and another virtual channel (path (1)). In addition, when data from the first memory region LD0 is provided to a memory device (e.g., the third memory device 250), which is different from the first memory device 230, the data may be transmitted to the third memory device 250 through the DMA engine 211 of the root complex 210 (path (2)).

In contrast, when the embodiment is applied as in FIG. 5B, a command executor (refer to 233 in FIG. 4) may determine whether data is transmitted between memory regions, and a transmission path of data may be controlled based on the determination result. For example, data read from the first memory region LD0 may not be output to the outside but be transmitted to the second memory region LD1 based on the control of a DMA engine 231 (path (1)). In contrast, when the request from the host device is a normal read request or corresponds to the transmission of data to a memory device, which is physically different from the first memory device 230, data read from the first memory region LD0 may be output to the outside based on the determination result of the command executor 233, and then transmitted to the third memory device 250 through the DMA engine 211 of the root complex 210 (path (2)).

Figure 6A:
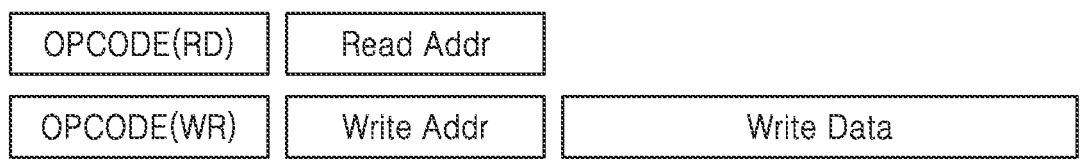
FIGS. 6A and 6B are respectively diagrams of an embodied example and an operation example of a request to which embodiments are not applied.
Figure 6B:
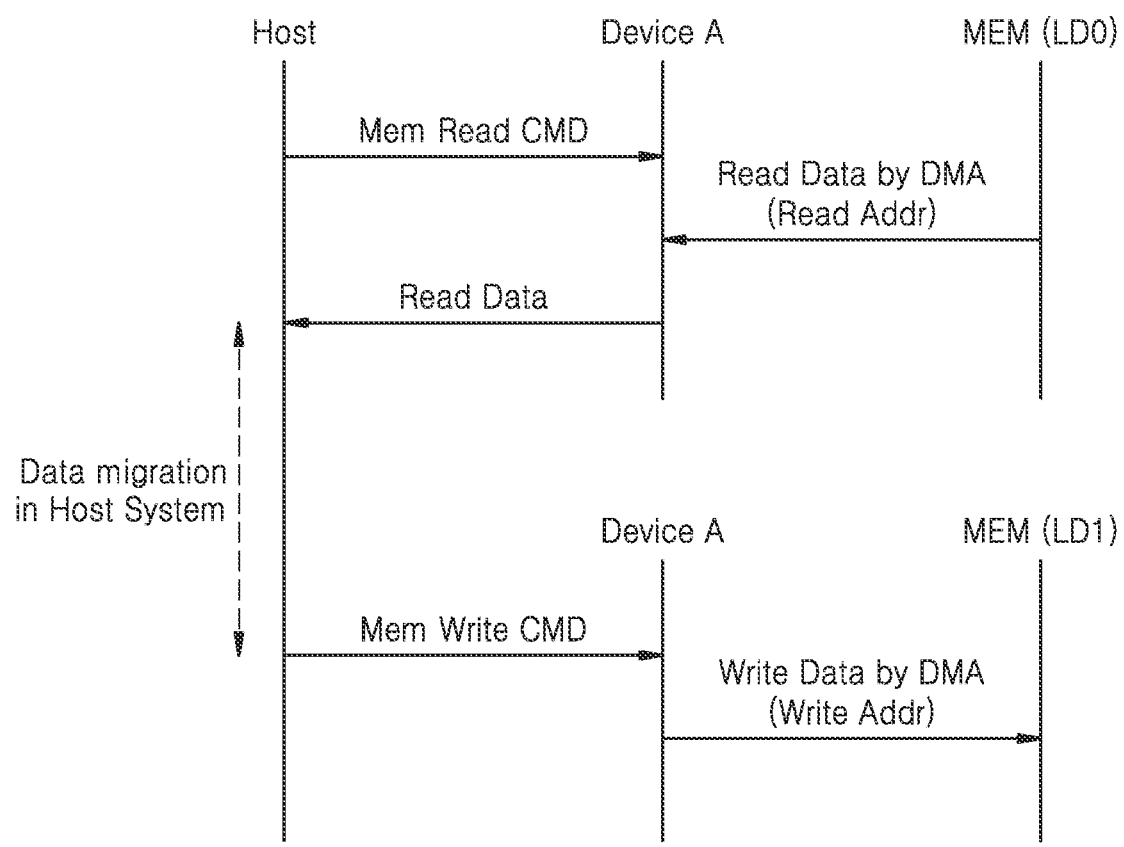
Figure 7A:
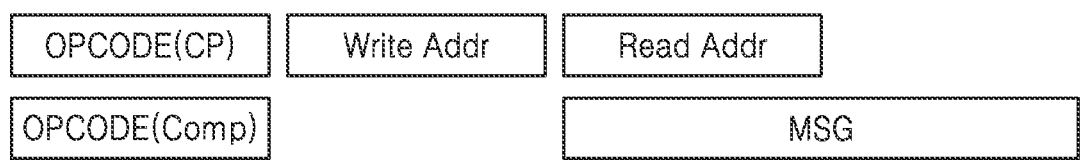
FIGS. 7A and 7B are respectively diagrams of an embodied example and an operation example of a request according to embodiments.
Figure 7B:
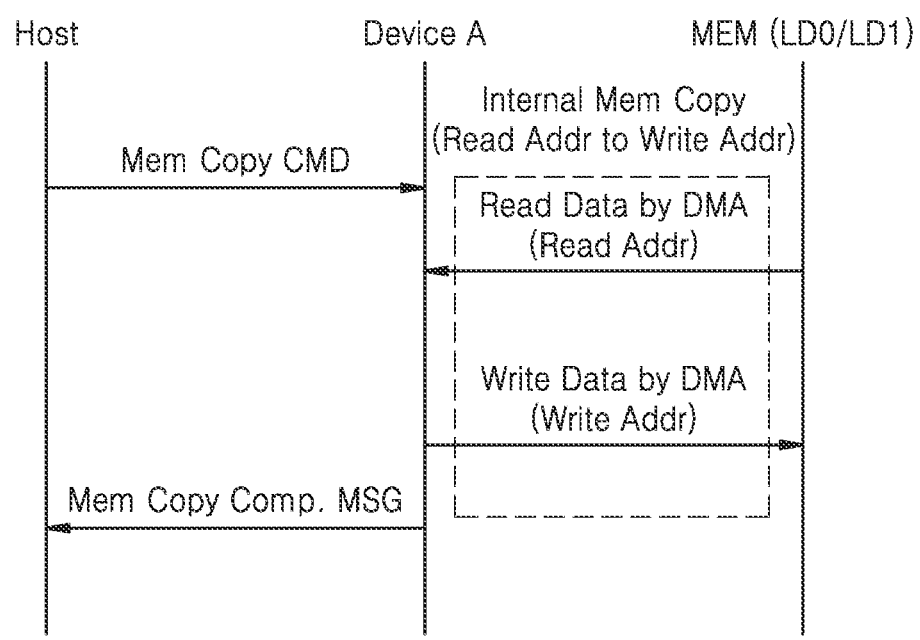

FIGS. 6A and 6B are respectively diagrams of an embodied example and an operation example of a request to which embodiments are not applied. FIGS. 7A and 7B are respectively diagrams of an embodied example and an operation example of a request according to embodiments. In FIGS. 6A and 6B and 7A and 7B, a memory device Device A includes a plurality of logical devices, and an operation of copying data from a source address (or a read address Read Addr) to a destination address (or a write address Write Addr) is illustrated.

Referring to FIGS. 6A and 6B, at least two requests may be sequentially provided by a host device Host to copy data. Each of the requests may include command code OPCODE indicating a type of a memory operation and an address and/or data indicating an access location.

For example, to read data stored in a first memory region LD0 of a memory MEM, the host device Host may provide a request including command code corresponding to a read command RD and a read address Read Addr indicating a location of the first memory region LD0 to a memory device Device A, and provide data read from the first memory region LD0 to the host device Host based on the control of a DMA engine. In addition, the host device Host may provide a request including common code corresponding to a write command WR, a write address Write Addr indicating a location of the second memory region LD1, and data to the memory device Device A, and write data to the second memory region LD1 corresponding to the location indicated by the write address Write Addr based on the control of the DMA engine. Thus, the copy operation may be completed.

Moreover, referring to FIGS. 7A and 7B, according to embodiments, a copy command CP indicating data copy between a plurality of logical devices in the same memory device may be defined. A request including the copy command CP and a read address Read Addr as a source address and a write address Write Addr as a destination address may be provided to the memory device Device A. The memory device Device A may read data from a first memory region LD0 of a memory MEM corresponding to the read address Read Addr without outputting the data to the outside based on the control of a DMA engine, and store the read data in a second memory region LD1 corresponding to the write address Write Addr. Thus, the migration of data in a host system as shown in FIG. 6B may not occur during the data copy. In addition, the memory device Device A may transmit a request including command code indicating the completion (Comp) of data copy and a message MSG, to a host device Host.

Figure 8:
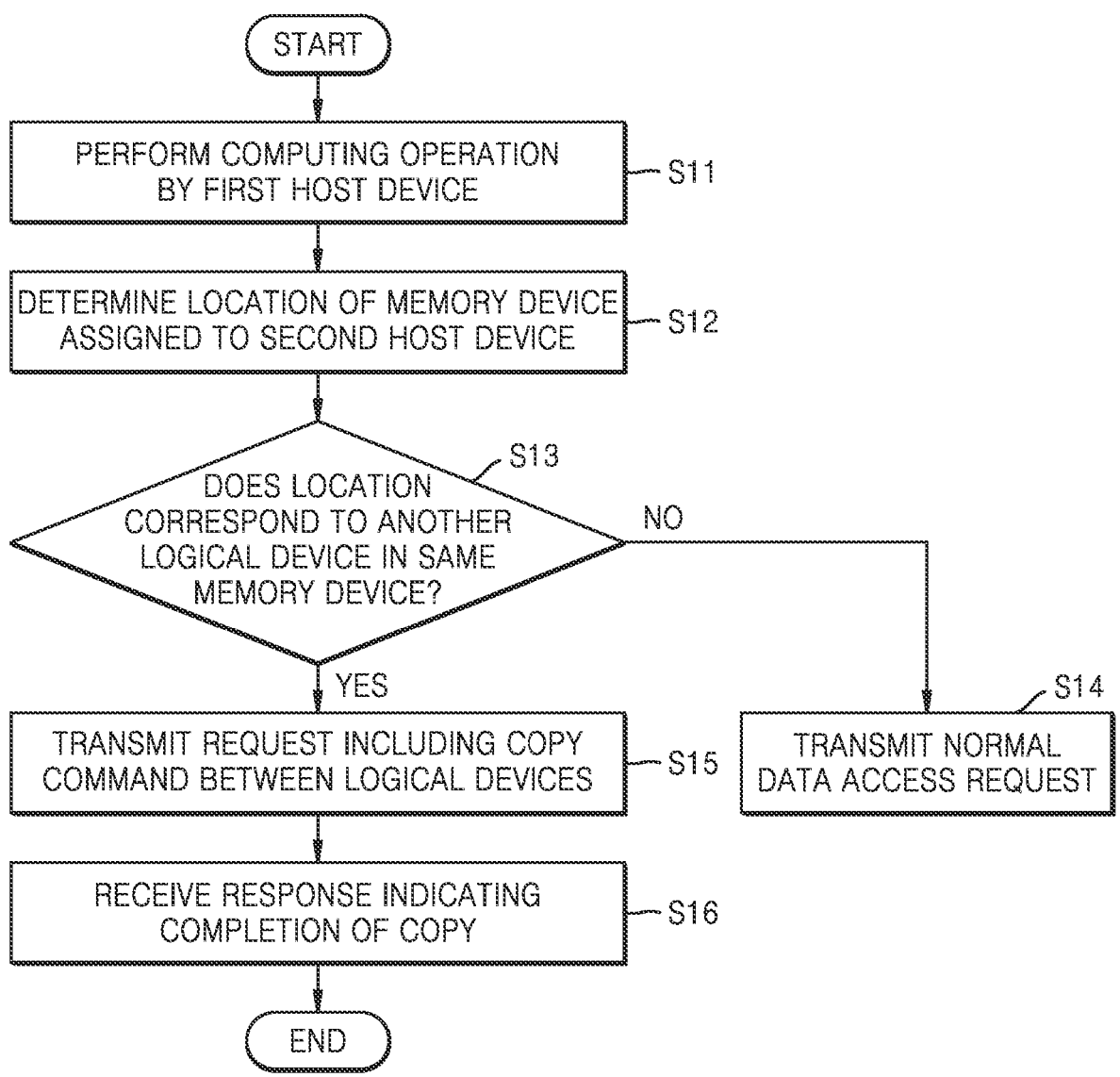
FIG. 8 is a flowchart of a method of operating a host system, according to embodiments.

FIG. 8 is a flowchart of a method of operating a host system, according to embodiments.

Referring to FIG. 8, the host system may include at least one host device and communicate with at least one memory device. According to an embodied example, the host system may be defined as further including a root complex and virtual channels according to the above-described embodiment along with the at least one host device. According to the above-described embodiments, one memory device including a plurality of logical devices may be shared between at least two host devices, and a first memory region (or a first logical device) of a first memory device may be assigned to a first host device.

In operation S11, a computing operation may be performed by the first host device based on access to the memory device. As an example of the computing operation, data may be copied from the first memory region of the first memory device assigned to the first host device to a memory device assigned to a second host device. In operation S12, the first host device may determine memory devices assigned to other host devices in the host system, and determine a location of the memory device assigned to the second host device. In operation S13, the first host device may determine whether the location of the memory device assigned to the second host device to which the data is to be copied corresponds to another logical device of the same first memory device.

When it is determined that the location to which the data is to be copied corresponds to a device that is physically different from the first memory device, data read and write operations may be sequentially performed according to the above-described embodiments. Accordingly, in operation S14, a normal data access request may be transmitted to memory devices, and thus, a data copy operation may be performed. Otherwise, when the location to which the data is to be copied corresponds to another logical device (e.g., a second memory region corresponding to a second logical device) in the first memory device, in operation S15, the first host device may transmit a request including a copy command between logical devices in the first memory device to the first memory device. According to embodiments the request may include addresses indicating a location from which the data is read and a location to which the data is to be copied. The first memory device may internally perform the data copy operation based on the control of a DMA engine in response to the request and output a response indicating the completion of the data copy operation, and in operation S16, the first host device may receive the response indicating the completion of the data copy operation.

Figure 9:
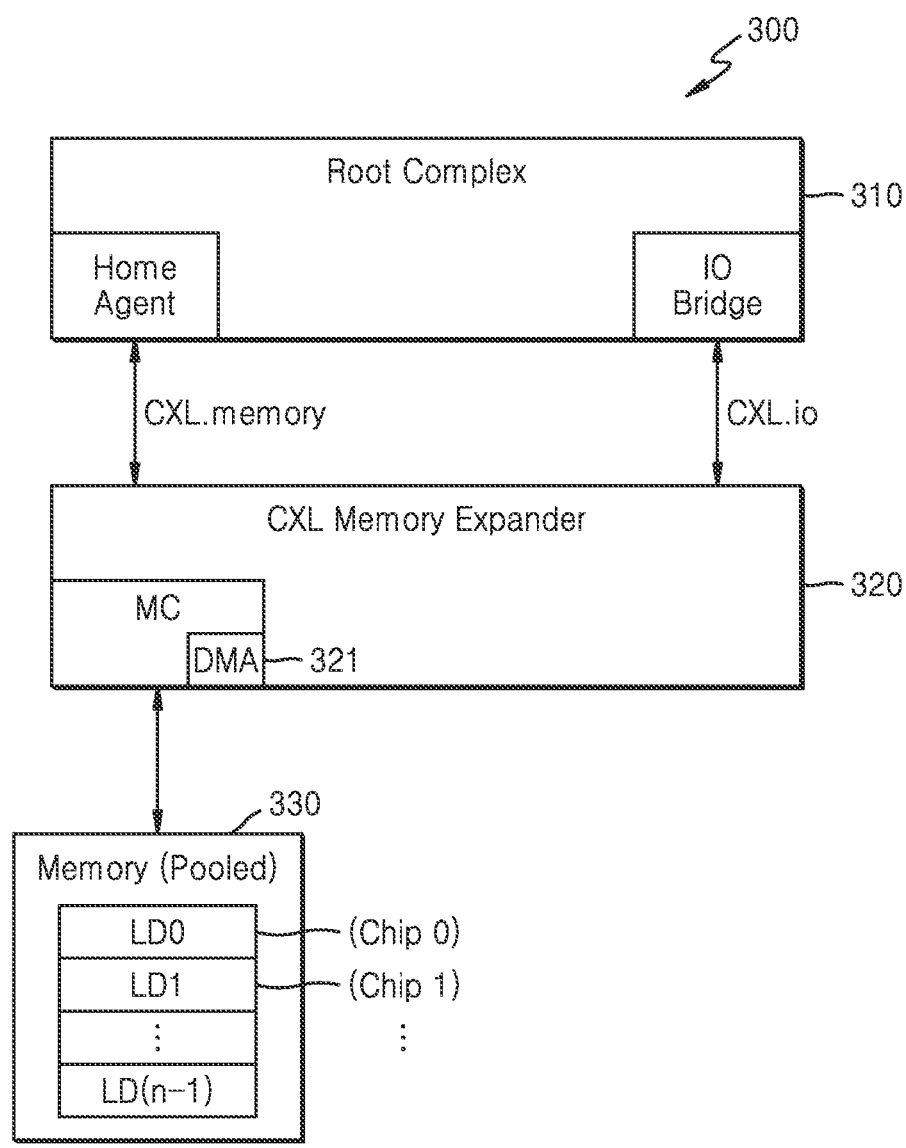
FIG. 9 is a block diagram of a system in which a memory device according to embodiments is applied to a CXL-based Type 3 device.

FIG. 9 is a block diagram of a system 300 in which a memory device according to embodiments is applied to a CXL-based Type 3 device.

Referring to FIG. 9, the system 300 may include a root complex 310 and a CXL memory expander 320 and a memory 330, which are connected to the root complex 310.

The root complex 310 may include a home agent and an I/O bridge. The home agent may communicate with the CXL memory expander 320 based on a memory protocol CXL.memory, and the I/O bridge may communicate with the CXL memory expander 320 based on an I/O protocol CXL.io. Based on a CXL protocol, the home agent may correspond to an agent on the side of a host located to solve the coherency of the system 300 entirely for a given address.

The CXL memory expander 320 may include a memory controller (MC). FIG. 9 illustrates an example in which the memory controller includes a DMA engine 321 configured to control a data transmission path between a plurality of logical devices according to the above-described embodiments. However, the present embodiment is not limited thereto, and the DMA engine 321 may be outside the memory controller. In the embodiment, the CXL memory expander 320 may output data to the root complex 310 through the I/O bridge based on the I/O protocol CXL.io or PCIe similar thereto.

Moreover, the memory 330 may include a plurality of memory regions (e.g., a first memory region LD0 to an n-th memory region LD(n−1)) according to the above-described embodiments, and each of the memory regions may be implemented as various units of memories. As an example, when the memory 330 includes a plurality of volatile or non-volatile memory chips, a unit of each of the memory region may be a memory chip. Alternatively, the memory 330 may be implemented such that the unit of each of the memory regions corresponds to one of various sizes (e.g., a semiconductor die, a block, a bank, and a rank) defined in a memory.

Figure 10:
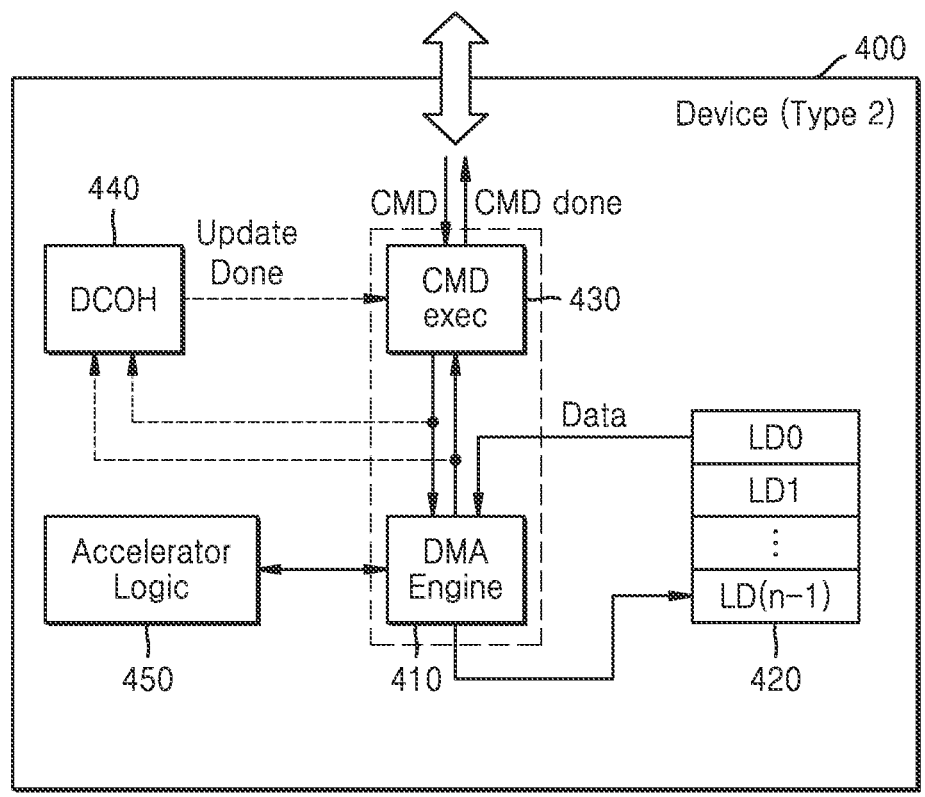
FIG. 10 is a diagram of a memory device in which a memory device according to embodiments is applied to a CXL-based Type 2 device.

FIG. 10 is a diagram of a memory device in which a memory device according to embodiments is applied to a CXL-based Type 2 device. The CXL-based Type 2 device may include various types of devices. According to the above-described embodiments, a Type 2 device may include an accelerator including an accelerator logic, such as a GPU and an FPGA.

Referring to FIG. 10, a device 400 may include a DMA engine 410, a memory 420, a command executor 430, a data coherence engine (DCOH) 440, which is based on a CXL, and an accelerator logic 450. As an example, because the device 400 corresponds to the CXL-based Type 2 device, the device 400 may include the memory 420. In an embodied example, as explained in the above-described embodiment, the device 400 may include a device-attached memory or be connected to the device-attached memory, and the memory 420 may correspond to the device-attached memory. Although FIG. 10 illustrates a case in which the memory 420 is in the device 400, the memory 420 may be outside the device 400 separately from the device 400. The device 400 may access a host memory based on a cache protocol CXL.cache or enable a host processor to access the memory 420 based on a memory protocol CXL.memory. In addition, the device 400 may include a memory controller. The memory controller may include the DMA engine 410 and the command executor 430.

According to the above-described embodiments, the memory 420 may include a plurality of memory regions recognized as different logical devices by host devices, and the command executor 430 may control a data access operation on the memory 420 by executing a command included in a request from a host device. Furthermore, the DMA engine 410 may control a transmission path of data that is read from the memory 420 or written to the memory 420. According to embodiments, the transmission path of the data may be controlled such that data read from any one memory region is copied to another memory region without being output through an interconnect located outside the memory device 400.

Moreover, the DCOH 440 may correspond to an agent that is arranged to solve coherency in relation to a device cache on a device. The DCOH 440 may perform a coherency-related function, such as the updating of metadata fields, based on processing results of the command executor 430 and the DMA engine 410 and provide update results to the command executor 430. The accelerator logic 450 may request access to the memory 420 through the memory controller and also, request access to a memory arranged outside the device 400 in a system.

Figure 11A:
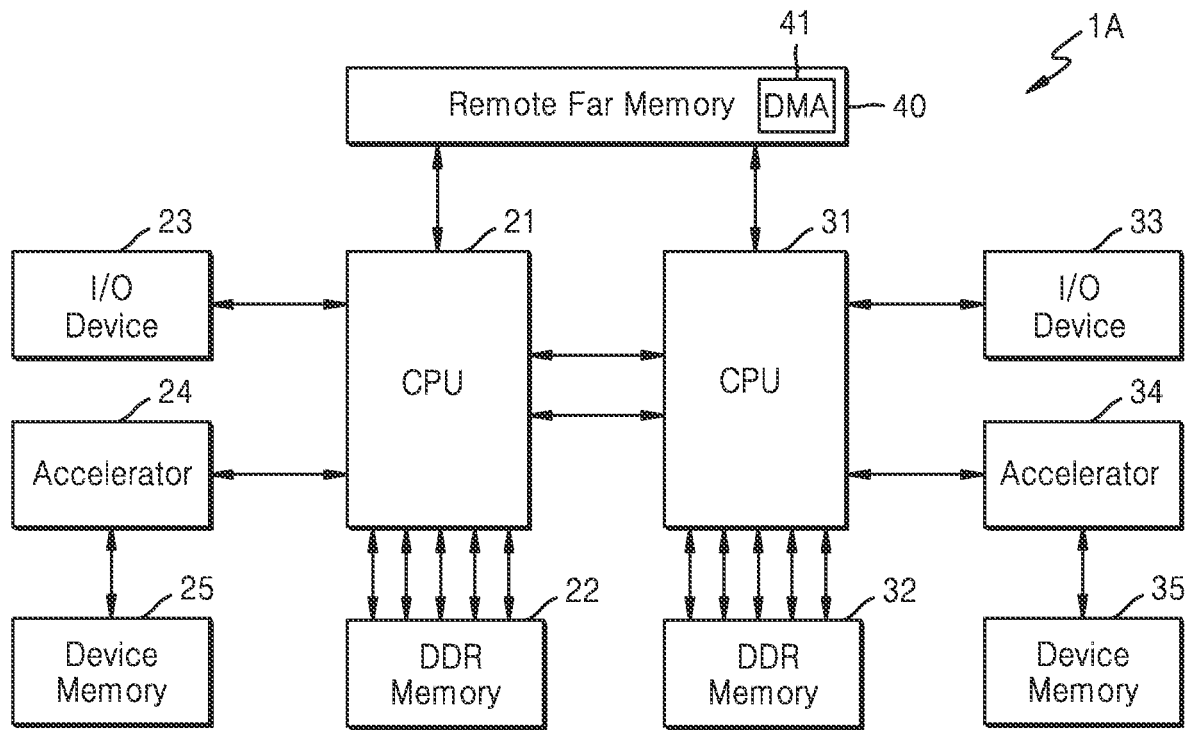
FIGS. 11A and 11B are block diagrams of a system, according to embodiments.
Figure 11B:
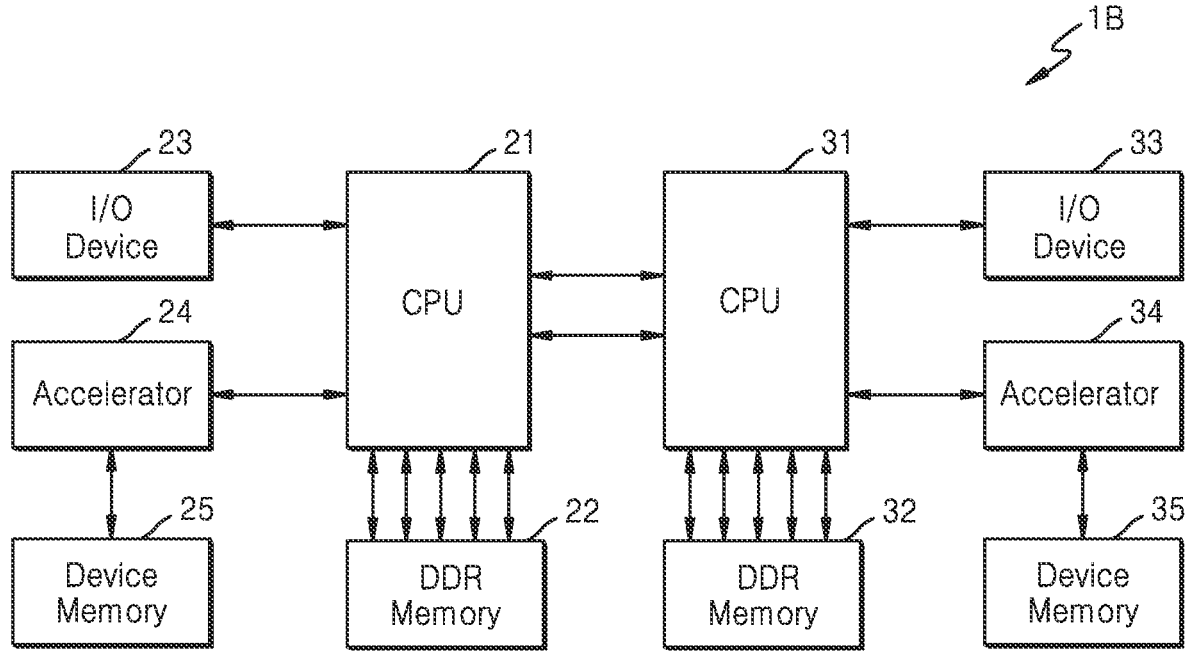

FIGS. 11A and 11B are block diagrams of a system according to embodiments. In detail, FIGS. 11A and 11B are respectively block diagrams of systems 1A and 1B each including a plurality of CPUs.

Referring to FIG. 11A, the system 1A may include a first CPU 21, a second CPU 31, a first double data rate (DDR) memory 22 and a second DDR memory 32, which are connected to the first CPU 21 and the second CPU 31, respectively. The first CPU 21 and the second CPU 31 may be connected using an interconnection system based on a process interconnection technique. The interconnection system shown in FIG. 11A may provide at least one CPU-to-CPU coherent link.

The system 1A may include a first I/O device 23 and a first accelerator 24, which communicate with the first CPU 21, and a first device memory 25 connected to the first accelerator 24. The first CPU 21 may communicate with each of the first I/O device 23 and the first accelerator 24 through a bus. In addition, the system 1A may include a second I/O device 33 and a second accelerator 34, which communicate with the second CPU 31, and a second device memory 35 connected to the second accelerator 34. The second CPU 31 may communicate with each of the second I/O device 33 and the second accelerator 34 through a bus. In some embodiments, any one or any combination of the first device memory 25 and the second device memory 35 may be omitted from the system 1A.

Furthermore, the system 1A may include a remote far memory 40. The first CPU 21 and the second CPU 31 may be connected to the remote far memory 40 through buses, respectively. The remote far memory 40 may be used to expand a memory in the system 1A. In some embodiments, the remote far memory 40 may be omitted from the system 1A.

The system 1A may perform communication based on at least some of a plurality of protocols through the buses. As an example, CXL protocols will be described. Information, such as initialization information, may be transmitted based on an I/O protocol CXL.io or messages and/or data may be transmitted based on a cache protocol CXL.cache and/or a memory protocol CXL.memory.

In the system 1A shown in FIG. 11A, the remote far memory 40 may be shared between at least two host devices. Although FIG. 11A illustrates a case in which the remote far memory 40 is shared between the first and second CPUs 21 and 31, the remote far memory 40 may be further shared between various other host devices. When a memory device according to embodiments is applied to the remote far memory 40, the remote far memory 40 may include a plurality of logical devices recognized as different devices, and data may be transmitted between the plurality of logical devices without outputting the data to the outside based on the control of a DMA engine 41.

Moreover, the system 1B of FIG. 11B may be substantially the same as the system 1A of FIG. 11A except that the system 1B of FIG. 11B does not include the remote far memory 40. Operations of a memory device according to embodiments may be applied to various memory devices shown in FIG. 11B. As an example, any one or any combination of the first DDR memory 22, the second DDR memory 32, the first device memory 25, and the second device memory 35 may include a DMA engine according to the above-described embodiments. Thus, data copy between a plurality of logical devices included in each of the any one or any combination of the first DDR memory 22, the second DDR memory 32, the first device memory 25, and the second device memory 35 may be performed.

Figure 12:
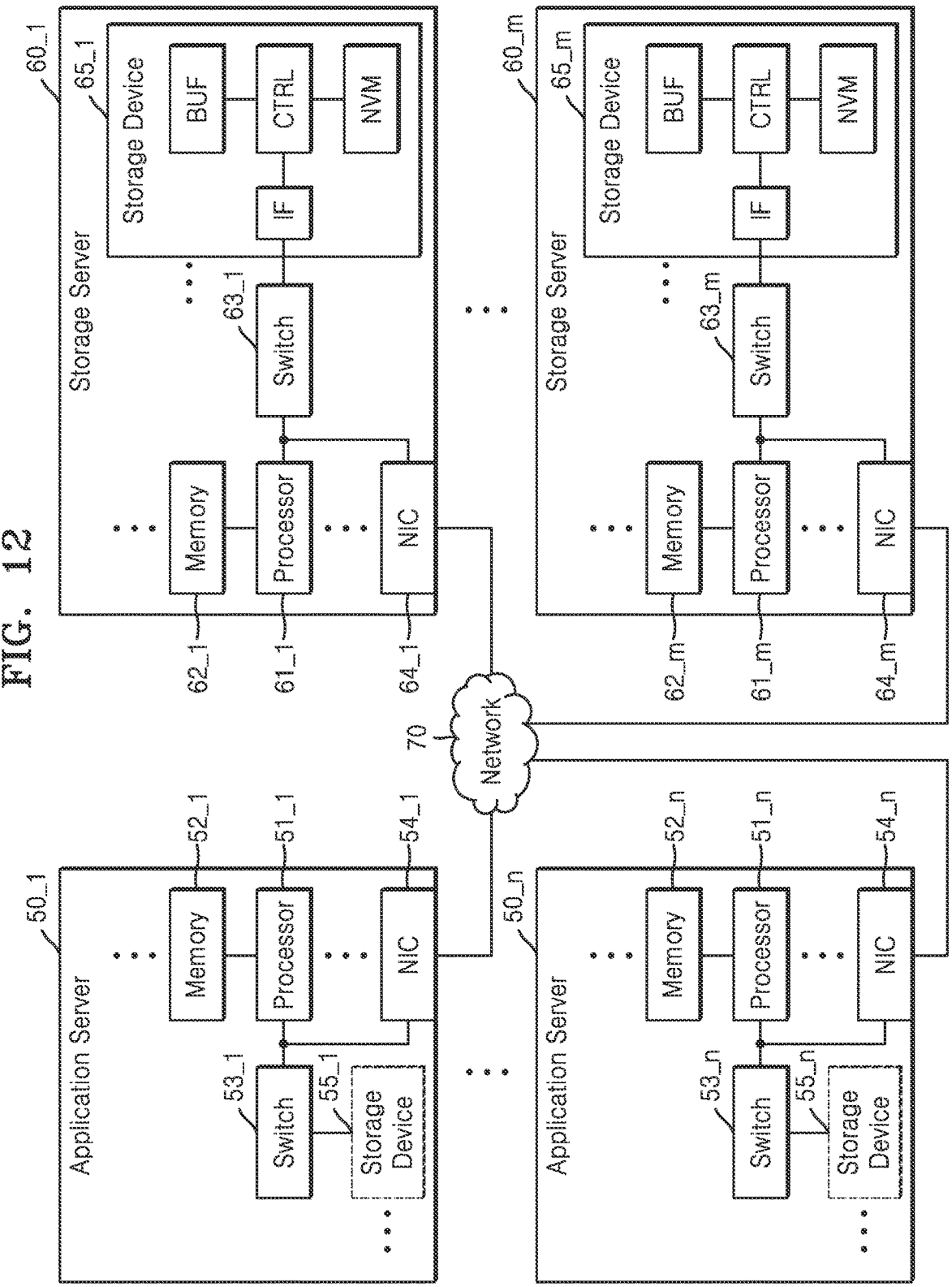
FIG. 12 is a block diagram of a data center including a system, according to embodiments.

FIG. 12 is a block diagram of a data center 2 including a system, according to embodiments. In some embodiments, the system described above with reference to the drawings may serve as an application server and/or a storage server and be included in the data center 2. In addition, a memory device according to embodiments and data copy between logical devices based on the control of a DMA engine, according to embodiments, may be applied to each of the application server and/or the storage server.

Referring to FIG. 12, the data center 2 may collect various pieces of data and provide services and be also referred to as a data storage center. For example, the data center 2 may be a system configured to operate a search engine and a database or a computing system used by companies, such as banks, or government agencies. As shown in FIG. 12, the data center 2 may include application servers 50_1 to 50_n and storage servers 60_1 to 60_m (here, each of m and n is an integer more than 1). The number n of application servers 50_1 to 50_n and the number m of storage servers 60_1 to 60_m may be variously selected according to embodiments. The number n of application servers 50_1 to 50_n may be different from the number m of storage servers 60_1 to 60_m.

The application servers 50_1 to 50_n may include any one or any combination of processors 51_1 to 51_n, memories 52_1 to 52_n, switches 53_1 to 53_n, NICs 54_1 to 54_n, and storage devices 55_1 to 55_n. The processors 51_1 to 51_n may control all operations of the application servers 50_1 to 50_n, access the memories 52_1 to 52_n, and execute instructions and/or data loaded in the memories 52_1 to 52_n. Non-limiting examples of the memories 52_1 to 52_n may include DDR SDRAM, a high-bandwidth memory (HBM), a hybrid memory cube (HMC), a dual in-line memory module (DIMM), a Optane DIMM, or a non-volatile DIMM (NVDIMM).

According to embodiments, the numbers of processors and memories included in the application servers 50_1 to 50_n may be variously selected according to embodiments. In some embodiments, the processors 51_1 to 51_n and the memories 52_1 to 52_n may provide processor-memory pairs. In some embodiments, the number of processors 51_1 to 51_n may be different from the number of memories 52_1 to 52_n. The processors 51_1 to 51_n may include a single core processor or a multi-core processor. In some embodiments, as illustrated with a dashed line in FIG. 12, the storage devices 55_1 to 55_n may be omitted from the application servers 50_1 to 50_n. The number of storage devices 55_1 to 55_n included in the storage servers 50_1 to 50_n may be variously selected according to embodiments. The processors 51_1 to 51_n, the memories 52_1 to 52_n, the switches 53_1 to 53_n, the NICs 54_1 to 54_n, and/or the storage devices 55_1 to 55_n may communicate with each other through a link described above with reference to the drawings.

The storage servers 60_1 to 60_m may include any one or any combination of processors 61_1 to 61_m, memories 62_1 to 62_m, switches 63_1 to 63_m, NICs 64_1 to 64_n, and storage devices 65_1 to 65_m. The processors 61_1 to 61_m and the memories 62_1 to 62_m may operate similar to the processors 51_1 to 51_n and the memories 52_1 to 52_n of the application servers 50_1 to 50_n described above.

The application servers 50_1 to 50_n may communicate with the storage servers 60_1 to 60_m through a network 70. In some embodiments, the network 70 may be implemented using a fiber channel (FC) or Ethernet. The FC may be a medium used for relatively high-speed data transmission. An optical switch that provides high performance and high availability may be used as the FC. The storage servers 60_1 to 60_m may be provided as file storages, block storages, or object storages according to an access method of the network 70.

In some embodiments, the network 70 may be a storage-only network, such as a storage area network (SAN). For example, the SAN may be an FC-SAN, which may use an FC network and be implemented using an FC Protocol (FCP). In another case, the SAN may be an Internet protocol (IP)-SAN, which uses a transmission control protocol/Internet protocol (TCP/IP) network and is implemented according to an SCSI over TCP/IP or Internet SCSI (iSCSI) protocol. In some embodiments, the network 70 may be a general network, such as a TCP/IP network. For example, the network 70 may be implemented according to a protocol, such as FC over Ethernet (FCoE), network attached storage (NAS), non-volatile memory express (NVMe) over fabrics (NVMe-oF).

The application server 50_1 and the storage server 60_1 will mainly be described below, but it may be noted that a description of the application server 50_1 may be also applied to another application server (e.g., 50_n), and a description of the storage server 60_1 may be also applied to another storage server (e.g., 60_m).

The application server 50_1 may store data, which is requested to be stored by a user or a client, in one of the storage servers 60_1 to 60_m through the network 70. In addition, the application server 50_1 may obtain data, which is requested to be read by the user or the client, from one of the storage servers 60_1 to 60_m through the network 70. For example, the application server 50_1 may be implemented as a web server or a database management system (DBMS).

The application server 50_1 may access the memory 52_n and/or the storage device 55_n included in another application server 50_n, through the network 70, and/or access the memories 62_1 to 62_m and/or the storage devices 65_1 to 65_m included in the storage servers 60_1 to 60_m, through the network 70. Accordingly, the application server 50_1 may perform various operations on data stored in the application servers 50_1 to 50_n and/or the storage servers 60_1 to 60_m. For example, the application server 50_1 may execute an instruction to migrate or copy data between the application servers 50_1 to 50_n and/or the storage servers 60_1 to 60_m. In this case, the data may be migrated from the storage devices 65_1 to 65_m of the storage servers 60_1 to 60_m to the memories 52_1 to 52_n of the application servers 50_1 to 50_n through the memories 62_1 to 62_m of the storage servers 60_1 to 60_m or directly. In some embodiments, the data migrated through the network 70 may be encrypted data for security or privacy.

In the storage server 60_1, an interface IF may provide physical connection between the processor 61_1 and a controller CTRL and physical connection between the NIC 64_1 and the controller CTRL. For example, the interface IF may be implemented using a direct attached storage (DAS) method in which the storage device 65_1 is directly connected to a dedicated cable. For example, the interface IF may be implemented using various interface methods, such as advanced technology attachment (ATA), serial ATA (SATA), external SATA (e-SATA), small computer small interface (SCSI), serial attached SCSI (SAS), PCI, PCIe, NVMe, IEEE 1394, a universal serial bus (USB), a secure digital (SD) card, a multi-media card (MMC), an embedded MMC (eMMC), a UFS, an embedded UFS (eUFS), and a compact flash (CF) card interface.

In the storage server 60_1, the switch 63_1 may selectively connect the processor 61_1 to the storage device 65_1 or selectively connect the NIC 64_1 to the storage device 65_1 based on the control of the processor 61_1.

In some embodiments, the NIC 64_1 may include a network interface card (NIC) and a network adaptor. The NIC 54_1 may be connected to the network 70 through a wired interface, a wireless interface, a bluetooth interface, or an optical interface. The NIC 54_1 may include an internal memory, a digital signal processor (DSP), and a host bus interface and be connected to the processor 61_1 and/or the switch 63_1 through the host bus interface. In some embodiments, the NIC 64_1 may be integrated with any one or any combination of the processor 61_1, the switch 63_1, and the storage device 65_1.

In the application servers 50_1 to 50_n or the storage servers 60_1 to 60_m, the processors 51_1 to 51_m and 61_1 to 61_n may transmit commands to the storage devices 55_1 to 55_n and 65_1 to 65_m or the memories 52_1 to 52_n and 62_1 to 62_m and program or read data. In this case, the data may be data of which an error is corrected by an error correction code (ECC) engine. The data may be data processed with data bus inversion (DBI) or data masking (DM) and include cyclic redundancy Code (CRC) information. The data may be encrypted data for security or privacy.

In response to read commands received from the processors 51_1 to 51_m and 61_1 to 61_n, the storage devices 55_1 to 55_n and 65_1 to 65_m may transmit control signals and command/address signals to a non-volatile memory device (e.g., a NAND flash memory device) NVM. Accordingly, when data is read from the non-volatile memory device NVM, a read enable signal may be input as a data output control signal to output the data to a DQ bus. A data strobe signal may be generated using the read enable signal. The command and the address signal may be latched according to a rising edge or falling edge of a write enable signal.

The controller CTRL may control all operations of the storage device 65_1. In embodiments, the controller CTRL may include static RAM (SRAM). The controller CTRL may write data to the non-volatile memory device NVM in response to a write command or read data from the non-volatile memory device NVM in response to a read command. For example, the write command and/or the read command may be generated based on a request provided from a host (e.g., the processor 61_1 of the storage server 60_1, the processor 61_m of another storage server 60_m, or the processors 51_1 to 51_n of the application servers 50_1 to 50_n). A buffer BUF may temporarily store (or buffer) data to be written to the non-volatile memory device NVM or data read from the non-volatile memory device NVM. In some embodiments, the buffer BUF may include DRAM. The buffer BUF may store metadata. The metadata may refer to user data or data generated by the controller CTRL to manage the non-volatile memory device NVM. The storage device 65_1 may include a secure element (SE) for security or privacy.

While the inventive concept has been shown and described with reference to embodiments thereof, it will be understood that various changes in form and details may be made therein without departing from the spirit and scope of the following claims.

What is claimed is:

1. A memory device configured to communicate with a plurality of host devices, through an interconnect, the memory device comprising:
    a memory comprising a plurality of memory regions that comprises a first memory region that is assigned to a first host device and a second memory region that is assigned to a second host device; and
    a direct memory access (DMA) engine configured to, based on a request from the first host device, the request comprising a copy command to copy data that is stored in the first memory region to the second memory region:
        read the stored data from the first memory region; and
        write the read data to the second memory region without outputting the read data to the interconnect.

2. The memory device of claim 1, wherein the plurality of memory regions are logical devices that are recognized as different memory devices by the plurality of host devices.

3. The memory device of claim 1, wherein the DMA engine is further configured to, based on the request from the first host device corresponding to an operation of copying the stored data to another memory device that is physically different from the memory device, read the stored data from the first memory region, and output the read data to the interconnect.

4. The memory device of claim 1, wherein the copy command is defined differently from a normal read command and a normal write command for the memory.

5. The memory device of claim 4, wherein the request comprising the copy command comprises a read address indicating the first memory region and a write address indicating the second memory region.

6. The memory device of claim 1, wherein the DMA engine is further configured to, based on the writing of the read data to the second memory region being completed, transmit, to the first host device, a response comprising a message indicating completion of the copying of the data stored in the first memory region to the second memory region.

7. The memory device of claim 1, wherein the DMA engine is further configured to communicate with the first host device and the second host device, through a root complex comprising a first root port and a second root port, and
    wherein the DMA engine is connected to the first root port through a first virtual channel and connected to the second root port through a second virtual channel.

8. The memory device of claim 1, further comprising a command executor configured to:
    based on the request from the first host device, execute a command; and
    based on the command being executed, control the DMA engine to copy the data stored in the first memory region to the second memory region without outputting the data to the interconnect.

9. The memory device of claim 1, wherein the memory comprises a Type 3 pooled memory defined in a compute express link (CXL) protocol.

10. The memory device of claim 1, wherein the plurality of memory regions comprises a plurality of non-volatile memory chips,
wherein the first memory region comprises any one of the plurality of non-volatile memory chips, and
wherein the second memory region comprises any other one of the plurality of non-volatile memory chips.

11. A method of operating a memory device, the memory device being configured to communicate with a plurality of host devices through an interconnect, the memory device comprising a plurality of memory regions that comprises a first memory region that is assigned to a first host device and a second memory region that is assigned to a second host device, and the method comprising:
receiving, from the first host device, a request comprising a copy command to copy data that is stored in the first memory region to the second memory region;
based on the request being received, reading the stored data from the first memory region; and
writing the read data to the second memory region without outputting the read data to the interconnect.

12. The method of claim 11, further comprising, based on the request from the first host device corresponding to an operation of copying the stored data to another memory device that is physically different from the memory device:
reading the stored data from the first memory region; and
outputting the read data to the interconnect.

13. The method of claim 11, further comprising, based on the writing of the read data to the second memory region being completed, transmitting, to the first host device, a response comprising a message indicating completion of the copying of the data stored in the first memory region to the second memory region.

14. The method of claim 11, wherein the memory device comprises a Type 3 pooled memory defined in a compute express link (CXL) protocol.

15. The method of claim 11, further comprising communicating with the first host device and the second host device, based on at least one protocol of peripheral component interconnect (PCI), PCI express (PCIe), compute express link (CXL), XBus, NVLink, infinity fabric, cache coherent interconnect for accelerators (CCIX), and coherent accelerator processor interface (CAPI),
wherein the first host device and the second host device communicate with each other based on at least one protocol of the PCI, PCIe, CXL, XBus, NVLink, infinity fabric, CCIX, and CAPI.

16. The method of claim 11, further comprising communicating with the first host device and the second host device, through a root complex comprising a first root port and a second root port,
wherein the memory device is connected to the first root port through a first virtual channel and connected to the second root port through a second virtual channel.

17. A host system comprising:
a root complex comprising a first root port and a second root port, the root complex being configured to provide an interconnect based on a predetermined protocol;
a first host device configured to communicate with a memory device through the first root port, a first memory region corresponding to a first logical device of the memory device being assigned to the first host device; and
a second host device configured to communicate with the memory device through the second root port, a second memory region corresponding to a second logical device of the memory device being assigned to the second host device,
wherein, based on the first host device transmitting, to the memory device, a request to copy data that is stored in the first memory region to the second memory region, the host system is configured to receive, from the memory device, a response indicating completion of the copying the data stored in the first memory region to the second memory region, without receiving the data from the memory device through the root complex.

18. The host system of claim 17, wherein each of the first host device and the second host device comprises any one or any combination of a central processing unit (CPU), a graphics processing unit (GPU), a neural processing unit (NPU), a field programmable gate array (FPGA), a network interface card (NIC), and a peripheral device configured to perform communication based on a compute express link (CXL) protocol.

19. The host system of claim 17, wherein the first host device is further configured to communicate with the memory device through the first root port and a first virtual channel, and
wherein the second host device is further configured to communicate with the memory device through the second root port and a second virtual channel.

20. The host system of claim 17, wherein the request to copy the stored data comprises a copy command, a read address indicating the first memory region, and a write address indicating the second memory region.

* * * * *